United States Patent [19]

Karubian

[11] 4,141,142
[45] Feb. 27, 1979

[54] CARCASS SPLITTING BAND-SAW

[76] Inventor: Ralph Karubian, 7100 S. Avalon Blvd., Los Angeles, Calif. 90015

[21] Appl. No.: 797,548

[22] Filed: May 16, 1977

[51] Int. Cl.² ............................................. B27B 13/08
[52] U.S. Cl. ...................................................... 30/380
[58] Field of Search .................... 30/380; 83/168, 818; 17/23

[56] References Cited

U.S. PATENT DOCUMENTS

| | | | |
|---|---|---|---|
| 1,516,529 | 11/1924 | Hall | 30/380 |
| 2,423,363 | 7/1947 | Biro | 83/168 |
| 2,596,081 | 5/1952 | Sacrey | 30/380 |
| 3,750,284 | 8/1973 | Swift | 30/380 |

*Primary Examiner*—Jimmy C. Peters
*Attorney, Agent, or Firm*—Whann & McManigal

[57] ABSTRACT

The present splitting saw generally comprises an elongated housing one end of which generally constitutes a drive end and the opposite end a driven end for an endless saw blade. The drive end mounts an electric motor connected by gearing to a drive pulley around which the drive end of said saw blade is trained, and the driven end is provided with a takeup pulley over which the opposite end of the pulley is trained.

Both the drive and the driven pulleys are provided with radially and uniformly spaced drive pins, and the saw blade is provided with apertures that are spaced to receive the outer ends of said drive pins thereby effecting drive connections between the drive pins and the pulleys and the apertures in the saw blade.

11 Claims, 10 Drawing Figures

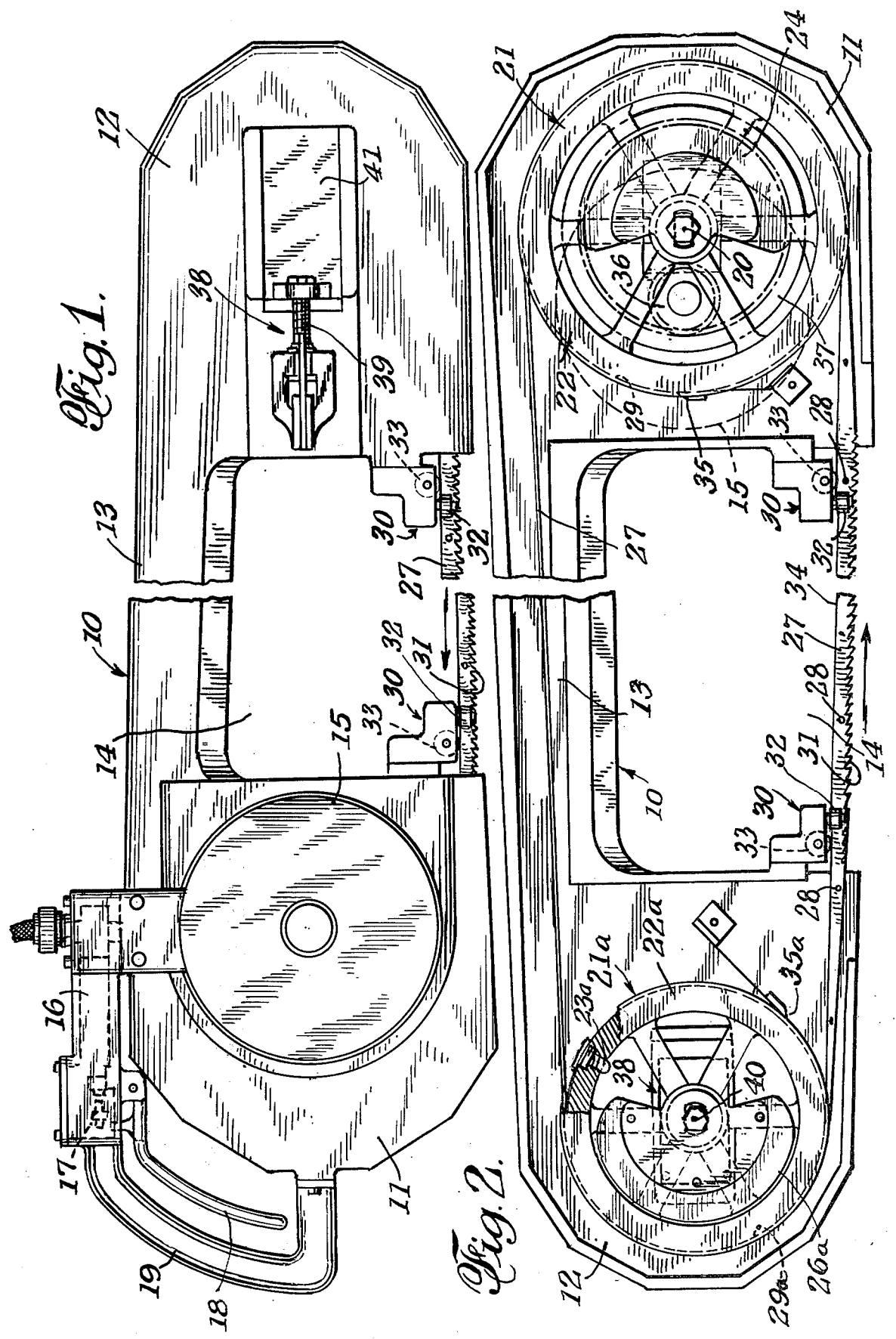

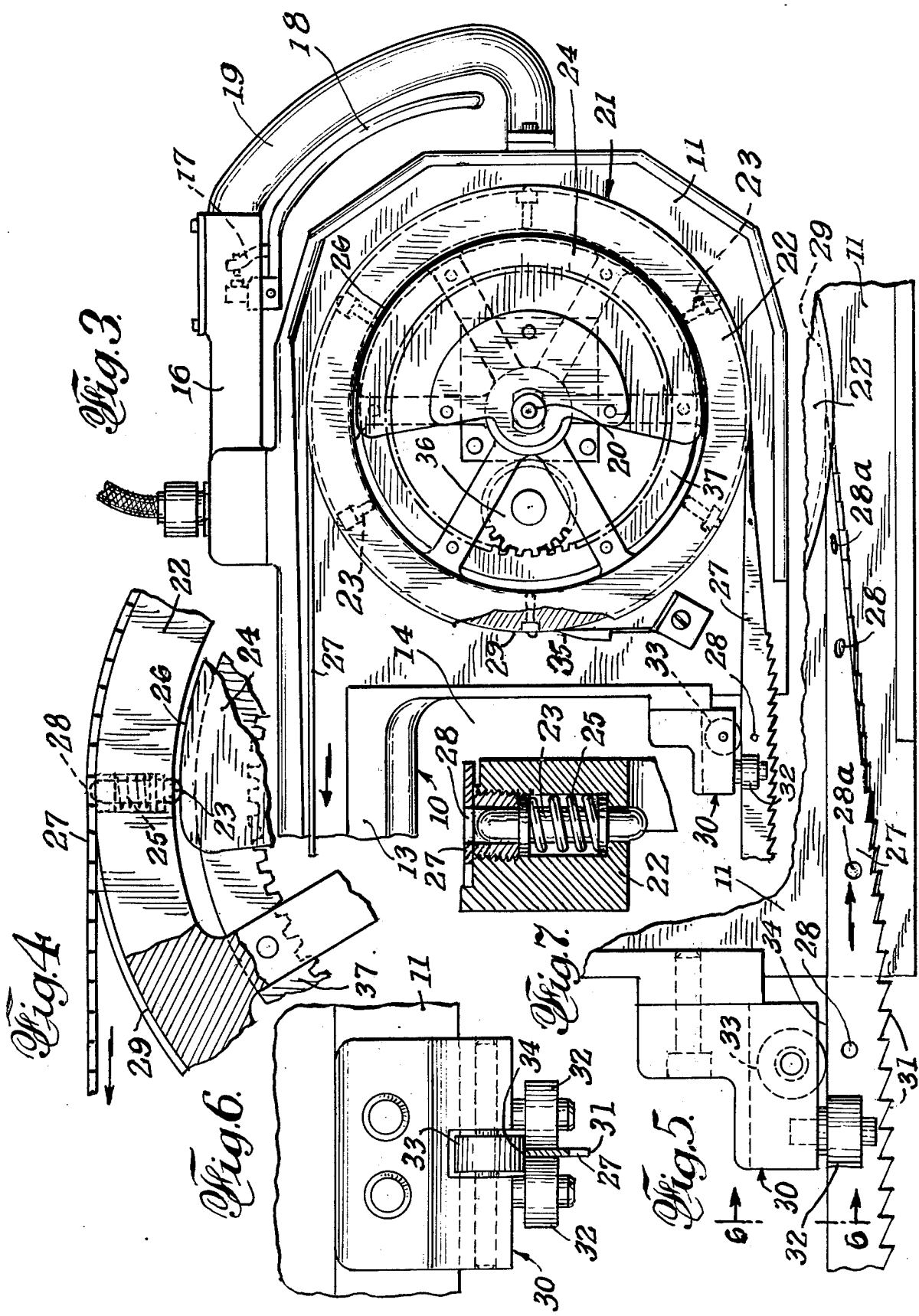

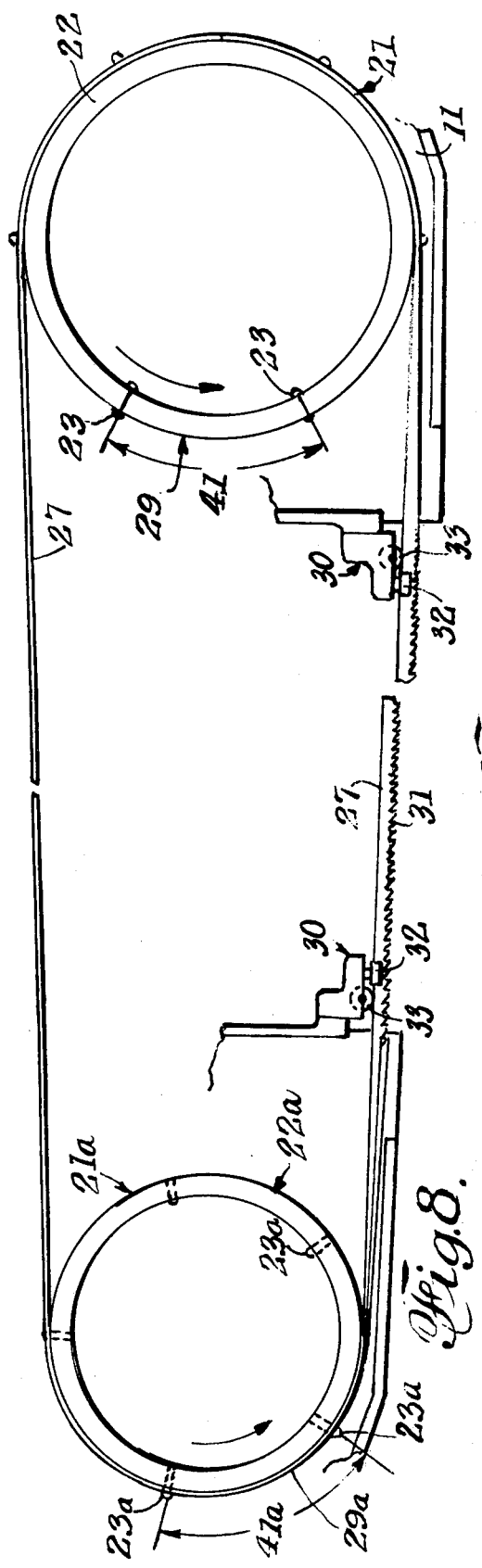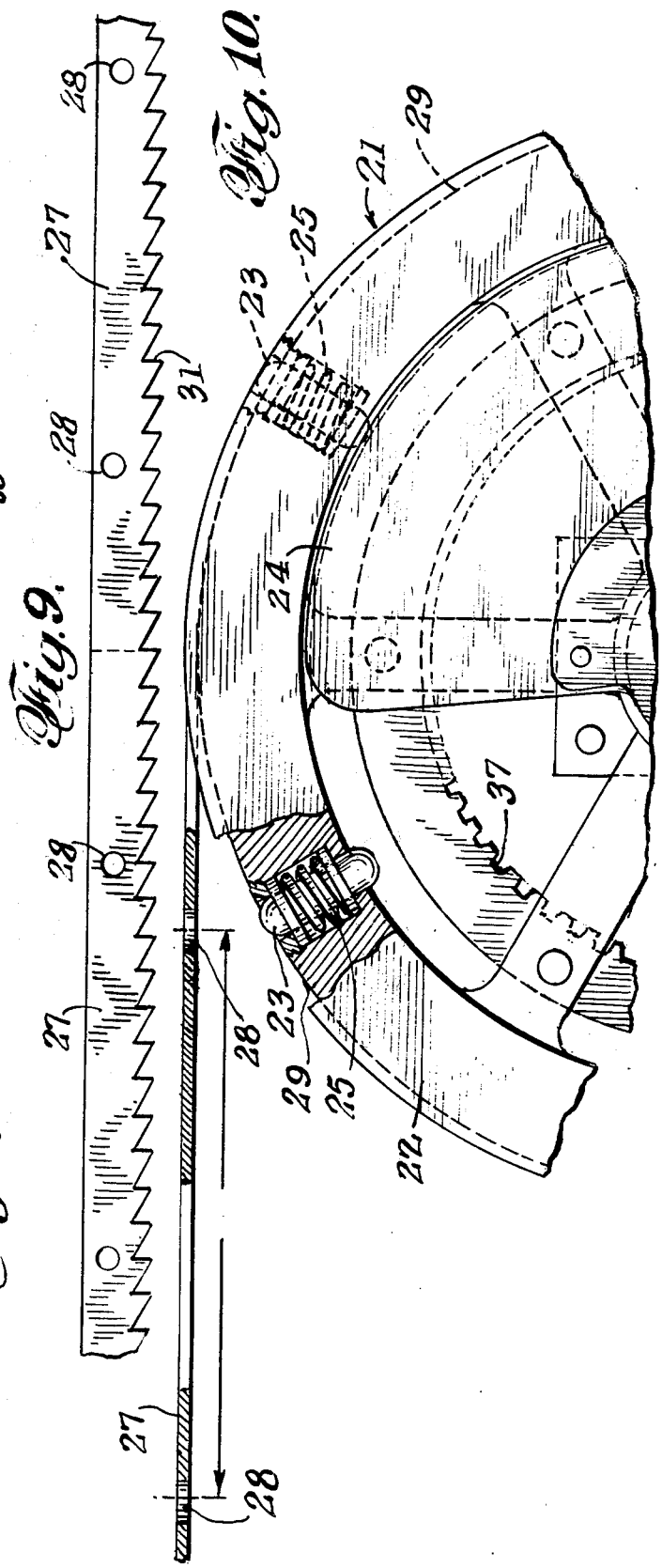

CARCASS SPLITTING BAND-SAW

BACKGROUND OF THE INVENTION

1. Field of the Invention

The provision of a bandsaw primarily for use in abattoirs to improve the facility of splitting carcasses of animals hung from overhead counter-balances for ease of movement of the splitter. The primary features of the present construction is the elimination of saw-clogging bone dust and meat particles and thereby creating positive driving of a bandsaw to the end that saw slippage of the saw on the rims of the drive pulleys is eliminated.

Further, the present drive means are so arranged that the surfaces of the drive pulley are readily kept clean, as by scraper means.

The foregoing features enable effecting a non-slipping, positive drive construction of the drive and driven means of the band saw.

2. Description of the Prior Art

While bandsaws for splitting carcasses have been used for many years, the same have had limited success due, primarily, to the collection of bone dust and meat particles which are drawn into the chamber in which they become lodged between the cutting blade and the pulleys over which the blade is trained.

The present structure includes means for stripping accumulations from the above-mentioned pulleys in the areas between the cutting run of the bandsaw and the return portion thereof between the driven and take-up pulleys.

Another feature of the present bandsaw structure is the provision in the peripheral rim of both driven and take-up pulleys of a plurality of radially arranged drive pins that are spring-retracted to be clear of the cleansing scrapers of both pulleys over which the bandsaw is trained.

Another novel feature is the provision of fixed cams concentric with the pulleys, each cam having semicircular edge that is directed to cause projection of the drive pins so that the outer ends of the pins are projected to engage uniformly spaced apertures in the band thereby effecting a non-slipping engagement between the two pulleys and the bandsaw trained therearound.

The spacing of the outer ends of the pins and of the apertures in the bandsaw produces a non-slipping drive of the band since, at all times, during operation of the bandsaw, those portions of the drive and driven wheels that are engaged with the bandsaw are trained over a peripheral surface of the wheels.

Another feature of the present invention is to provide a saw construction that, in addition to the features hereinbefore described, not only provides the non-slippage feature, but is arranged to have the above-mentioned drive pins so formed as to retain the saw blade from totally slipping off the pulley surfaces over which the blade is trained.

Said pins perform another important service. Since the portion of the bandsaw that slits the carcass is flexed so that the saw teeth are directed downwardly by being transversely flexed by longitudinally-spaced saw-guiding wheels, the flexure of the above portion of the above saw is such as to have the saw teeth directed downwardly when the saw is held in a horizontal position while being used.

The above invention further comprises novel details of construction and novel combinations and arrangements of parts which will more fully appear in the course of the following description that is based on the accompanying drawings. However, said drawings merely show and the description merely describes the invention with respect to a preferred embodiment, the same being given by way of illustration or example only.

BRIEF DESCRIPTION OF THE DRAWINGS

FIG. 1 is a fore-shortened side elevational view of one face of the present band-saw assembly.

FIG. 2 is a similar fore-shortened elevational view of the opposite side of said band-saw assembly.

FIG. 3 is an enlarged view of the right hand end of the saw assembly as seen in FIG. 2, the saw-driving means being shown in greater details.

FIG. 4 is a further enlarged portion of the cam-controlled drive pins that are shown in the upper portion of FIG. 3.

FIG. 5 is a similarly enlarged fragmentary lower portion of FIG. 3, the same showing the guide means that engages the blade and imparts a quarter turn to the blade so as to direct the cutting teeth in an outward direction so said teeth will cut into a carcass to which the saw is applied.

FIG. 6 shows that blade guide as seen in the direction of the arrows 6—6 of FIG. 5.

FIG. 7 is an enlarged cross-sectional view as taken across the rim of either pulley 21 and 22 showing the band-saw engaging pins and their manner of operation.

FIG. 8 is a semi-diagrammatic view, to a reduced scale, showing the respective drive pins of the driving and driven pulleys.

FIG. 9 shows an enlargement of a portion of the band-saw that is shown in FIG. 8.

FIG. 10 is an enlarged side view of the upper portion of the drive pulleys and also how the drive pins provided in the rim successively engage holes uniformly spaced as shown in FIG. 8, thereby obviating slippage of the bandsaw relative to the outer circumferential surfaces of the pulleys as will be disclosed hereafter.

DESCRIPTION OF THE PREFERRED EMBODIMENT

The present band-saw comprises an elongated body 10 that is formed at one end 11 with a power or driving means, at its opposite end with a take-up end, and with an intermediate connecting portion 13 that is offset to one side of an elongated space 14. Said space 14 is open to the side of the body opposite to the connecting portion 13 of said body.

The power portion of the body mounts an electric or similar motor 15, the same being provided with an offset extension 16 that houses a switch 17 that may be closed by a trigger 18 houses within a hand grip 19 extending from the outer end 11 of the body 10.

The shaft 20 of said motor mounts a drive pulley 21 the rim 22 of which is fitted with a plurality of uniformly spaced drive pins 23 that are projected, during rotation of the drive pulley 21 by the motor 15, by engagement with the cam 24. From FIG. 7 it will be seen that the drive pins 23 are retracted by coil springs 25. It will be noted from FIG. 3 that the cam 24 has its edge 26 oriented to depress the drive pins 23 against the bias of their springs 25.

The take-up end 12 of the saw is somewhat similar to the power end 11 in that the take-up pulley 21a, while smaller than the drive pulley 22, is provided with a compliment of drive pins 23a similar to the drive pins 23 in the pulley rim 22.

The present device is equipped with a bandsaw 27, the outer ends thereof being trained around the respective outer surfaces of said pulleys 21 and 21a, the remainder of the bandsaw having portions that span across the opening 14 that is opposite to the portion 13 above mentioned.

Said bandsaw is provided with two series of holes 28 and 28a that are respectively spaced according to the distance around the respective outer surfaces 29 and 29a of the respective pulleys 21 and 21a. This difference in the spacing of the holes 28 and 28a is brought about by the difference in the diametric sizes of sid pulleys. If the pulleys are of equal size, only one series of holes 28 may be provided in the bandsaw 27.

An important feature of the present band-saw is the provision of means 30, to so engage the portions of the band-saw that move across the open side of the elongated space 14 as to impart a quarter turn to the bandsaw in a manner to move the saw teeth 31 from a transverse position to a position that directs them away from the space 14. As shown best in FIGS. 5 and 6, the portions of the band-saw 27 that extend between the means 30 at the opposite ends of the space 14, by means of rollers 32 between which the bandsaw is guided.

In addition to said rollers 32, transversely arranged rollers 33 engage and guide the upper edges 34 of the bandsaw to guide that portion of the saw that spans between said rollers 33. In this manner the band-saw, although flexible, maintains rigidity in its carcass-cutting portion that extends between the pairs of rollers 32.

Whatever cuttings may find their way onto the surfaces 29 of the pulleys 21 and 21a, are removed by flexible scrapers 35 and 35a of said pulleys 21 and 21a respectively, such particles falling from the bottom of the space 14.

To provide the saw with pulleys that have a relatively slow rotation, the motor 15 is fitted with a relatively small drive pinion 36 which drives a gear ring 37 mounted on the pulley 21. Thus, the speed of the motor is translated into a relatively slower but more powerful rotation of the drive pulley 21 and a similarly more powerful movement of the band-saw. This rotation of the drive pulley is transmitted by the drive pins 23 during the time the same are projected by the respective cam edges 26 and 26a.

The spacing between the pulley assemblies may be adjusted to provide a proper tension on the bandsaw 27. A typical device 38 provided with an adjusting screw 39 that interconnects the axis 40 of the takeup pulley 21 with a take up plate 41 that is adjustable relative to a tension.

Said bandsaw if provided with a series of holes 28 that are uniformly spaced a distance 41 which in the pulley 21 of FIG. 7, spans one-sixth of the circumference of said pulley 22.

In this case the pulley 22a has a circumferential size that is four-fifths that of the drive pulley 22.

In order that there was no slippage between the bandsaw and the outer surfaces 29 and 29a of the pulleys 21 and 21a. In this instance the pulleys 21 and 21a are so proportioned that the pulley 21 is provided with six drive pins 23 and the pulley 21a with five such pins.

The respective dimensions 41 and 41a indicate that the relative arcuate dimensions 29–29a on the respective pulleys are equal. In this manner, regardless that the pulley 21 is larger than the pulley 21a, the apertures 28 are equally spaced since the spaces of the pins 23 of both pulleys are equal. In this manner it is made certain that the bandsaw is, at all times, in non-slippage engagement with both pulleys.

If the drive and driven pulleys are of the same size, the drive pins of each pulley are similarly spaced. Regardless of the relative diametral size of the pulleys 21 and 21a the arcuate spacing of the pins 23 and 23a is the same regardless whether both pulleys are of the same circumferential size or not the arcuate spacing of the pins of both pulleys are arranged so the same are equal.

Having thus described my invention, what I claim and desire to secure by Letters Patent is:

1. A portable carcass-splitting band-saw assembly comprising, in combination, an elongated body having:
   one hollow end mounting a transverse axle that extends outwardly across said hollow body end, and a drive pulley provided with an outer rim and mounted on said axle,
   a fixed cam having a semi-circular outer face that extends around approximately 180° between the upper and lower end of the cam, and
   a plurality of spring-depressed drive pins that extend radially through the rim of the mentioned drive pulley, said pins being aligned with the mentioned semi-circular cam face and are projected by said face to extend beyond the outer surface of the pulley rim and into driving engagement with that portion of a bandsaw blade that is trained over the portion of the outer surface of the mentioned rim that is coextensive with the semi-circular surface portion of the mentioned cam.

2. The combination of claim 1 including, in the opposite end of the elongated body a similar but oppositely arranged fixed cam and a similar but freely rotational pulley having spring-depressed drive pins that extend radially through the rim of the freely rotational pulley, the rim of the latter pulley being provided with drive pins similar to those of the drive pulley; a fixed cam having a semi-circular cam face that is opposite to that of the cam face of the driven pulley, the last mentioned drive pins when projected by the earlier mentioned drive pins projecting them into registering engagement with that portion of the band-saw that is trained over the outer rim of the mentioned driven pulley.

3. The combination of claim 2 in which the freely rotational pulley is housed in a hollow end similar but opposite the first-mentioned body end, said body having an intermediate portion connecting said hollow ends, the intermediate connecting portin being offset and housing one portion of the band-saw that extends between the driving and driven pulleys; said connecting portion and the two hollow body portions defining an elongated space that is open to expose the opposite portion of the band-saw blade that extends between the hollow ends of the body.

4. The combination of claim 3 in which the inner faces of the opposed ends of the saw body are provided with blade guides provided with saw blade rollers that impart a 90° transverse torsion on that portion of the blade that spans between the opposite portions of the enlongated body, thereby causing the teeth of the bandsaw blade portion between said rollers to be directed so the teeth of said portion, as the bandsaw operates, cuts from above, into carcasses of animals hung from an overhead counter-balancer for ease of movement.

5. The combination of claim 4 in which means in the form of two flexible scrapers, one directed to resiliently engage the outer rim of the drive pulley and the other to engage the outer rim of the driven pulley to remove bone dust and meat particles from said pulley rims so the surface of the bandsaw blade that contacts the outer surfaces of both pulleys have non-slippage engagement with the inner surface of the blade.

6. A band assembly having a drive pulley, an endless band-saw having a plurality of equally spaced holes and mounted around said drive pulley, and cleaning means adapted to engage the surface of said drive pulley, comprising:
   (a) a plurality of retractable spring loaded pins mounted on said drive pulley, said spring loaded pins being normally biased inwardly for engaging at least several of said plurality of equally spaced holes; and
   (b) projecting means mounted in close proximity to the inner surface of said drive pulley for projecting said pins outwardly during a portion of the rotational cycle of said drive pulley whereby said pins are urged into at least several of said plurality of equally spaced holes to thereby provide traction between said drive pulley and said band-saw without interfering with the operation of said cleaning means.

7. The combination as described in claim 6 and wherein said cleaning means is a scraper positioned to scrape cuttings off of said drive pulley.

8. The combination as described in claim 7 and wherein said projecting means comprises a cam mounted to project said pin outwardly during a portion of the rotational cycle of said drive pulley.

9. The combination as described in claim 8 and wherein said pins are arranged in holes which are equidistant circumferentially around the surface of said drive pulley with the circumferential distance between pins being equal to the distance between said equally spaced holes in said band-saw.

10. The combination as described in claim 8 and wherein said band-saw assembly further includes:
    (a) a freely rotational pulley;
    (b) a plurality of retractable spring loaded pins mounted on said rotational pulley, said spring loaded pins being normally biased inwardly for engaging at least several of said plurality of equally spaced holes; and
    (c) second projecting means mounted in close proximity to the inner surface of said rotational pulley for projecting said pins mounted on said rotational pulley outwardly during a portion of the rotational cycle of said rotational pulley whereby said pins are urged into at least several of said plurality of equally spaced holes.

11. The combination as described in claim 13 and wherein said projecting means mounted in close proximity to the inner surface of said drive pulley comprises a first cam mounted to project said pins outwardly during a portion of the rotational cycle of said drive pulley; and
    (a) said second projecting means comprises a second cam mounted to project said pins outwardly during a portion of the rotational cycle of said rotational pulley.

* * * * *